United States Patent
Lu et al.

(10) Patent No.: US 8,312,014 B2
(45) Date of Patent: Nov. 13, 2012

(54) LATERAL SEARCH

(75) Inventors: Qi Lu, San Jose, CA (US); John Thrall, Fremont, CA (US); David Ku, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1763 days.

(21) Appl. No.: 11/024,234

(22) Filed: Dec. 27, 2004

(65) Prior Publication Data

US 2005/0192946 A1 Sep. 1, 2005

Related U.S. Application Data

(60) Provisional application No. 60/533,327, filed on Dec. 29, 2003.

(51) Int. Cl.
*G06F 7/00* (2006.01)
*G06F 17/00* (2006.01)
*G06F 17/30* (2006.01)

(52) U.S. Cl. ........ 707/732; 707/710; 707/717; 707/721; 707/736; 707/766

(58) Field of Classification Search .......... None
See application file for complete search history.

(56) References Cited

U.S. PATENT DOCUMENTS

| | | | | |
|---|---|---|---|---|
| 6,486,892 | B1 * | 11/2002 | Stern | 715/760 |
| 6,868,525 | B1 * | 3/2005 | Szabo | 715/738 |
| 6,968,366 | B1 * | 11/2005 | Zhang et al. | 709/219 |

OTHER PUBLICATIONS http://web.archive.org/web/20020222232203/http://www.altavista.com. Feb. 22, 2002, 2 pages.
http://web.archive.org/web/20011019003608m_1/www.goggle.com, Oct. 19, 2001, 1 page.
Manber, Udi, et al., "The Search Broker," http://www.webglimpse.org/sb/paper.html, Dec. 24, 2004, 10 pages.

* cited by examiner

*Primary Examiner* — Susan Chen
(74) *Attorney, Agent, or Firm* — Seth H. Ostrow; Ostrow Kaufman LLP

(57) ABSTRACT

A search query is received. Personal information for a user is then determined. A search is performed in a general subdomain of general content using the search query. For example, the general subdomain of general content may be a WWW search. Then, a vertical subdomain is determined based on the personal information. A search is then performed in the vertical subdomain of specialized content using the search query. The search performed in the general subdomain and the search performed in the vertical subdomain generate general search results and vertical search results. The results may be combined and outputted to a client.

8 Claims, 7 Drawing Sheets

*Yahoo!*

| Search Results | [camera] [Search] |
| Your search: camera | Search in: The Web \| Directory \| News |

*Inside Yahoo!*
602 { Auctions: over 800 Camera products on *Yahoo!* Auctions     600
     Yellow Pages: find a Camera Store near you Directory Category Matches      1 - 3 of 25 Next 20

604 {
- Photography > Cameras
- Shopping > Cameras
- List "camera" results by location Sponsor Matches 606 {
- Camera Specials • Cameras for sale. Complete kits starting at $50.
  www.-----.com
- Camera - Compare Prices at -----.com, At -----.com, compare prices, ratings and reviews from brand name stores.
  www.-----.com
- Digital & 35mm Cameras-Vestibulum condimentum tortor vitae uma. Mauris at ante lacinla leo lacinla suscipit.
  www.loremipsumserwer.com 1 - 4 of 14,800,000 \| Next 4

Web Matches

608 {
1. La Camera - Praesent ultrices orci. Aenean pretium, neque quis dapibus sodales.
   www.------.com/ search within this site
2. Digital Camera Resource Page - Preasent non orci. Aenean pretium noque quis dapibus sodales, sem augue.
   www.camera----------resource.com/ search within this site.
   More sites about Digital Photography
3. Camera, The
   www.thecamera------.com/ search within this site
   More sites about Local > Newspapers
4. CAMERA Studies -pharctra onim, portitilor lacina magna felis ac lectus Integer sapien diam, gravida id.
   www.camera-studies-----------.org/ search within this site    610

| Advertisement |
| Search in: The Web \| Directory \| News |

612 { Related Searches: digital camera, camera review, hidden camera video camera 614 { There are more results for camera in... *Yahoo! Shopping*, *Yahoo! Yellow Pages*, *Yahoo! Auctions* and *Yahoo!games*   Search in other search engines More...

Copyright © 2003 *Yahoo!* Inc. All rights reserved. Privacy Policy - Terms of Service - Suggest a Site - Ad Feedback

LATERAL SEARCH

CROSS-REFERENCES TO RELATED APPLICATIONS

This application claims the benefit of the filing date of U.S. Provisional Patent Application No. 60/533,327, entitled "Lateral Search", filed Dec. 29, 2003, which is incorporated by reference in its entirety for all purposes.

This application is related to U.S. patent application Ser. No. 10/819,082, entitled "Search System Using Search Subdomain and Hints to Subdomains in Search Query Statements and Sponsored Results on a Subdomain", filed Apr. 5, 2004, (hereinafter "Hints application"), which is incorporated by reference in its entirety for all purposes.

BACKGROUND OF THE INVENTION

The present invention generally relates to content retrieval and more specifically to methods and apparatus for retrieving content in response to a search request.

With the advent of the Internet and the multitude of web pages and media content available to a user over the World Wide Web (WWW), there has become a need to provide the users with streamlined approach to filter and obtain desired information from the WWW. Search systems and processors have been developed to meet the needs of users to obtain desired information. Examples of the technologies may be accessed through Yahoo!, Google, and other sites. Typically, a user inputs a query and a search process returns one or more links (in the case of searching web), documents and/or references (in the case of a different search corpus related to the query), etc.

Typically, when a query is received, a search may be performed with information in a generic or default corpus, such as the WWW. This may be referred to as a general search. Also, some search systems allow a user to perform searches in subdomains that include specialized content. For example, Yahoo! includes content that is organized in a number of subdomains. An example of a subdomain may be automobiles, shopping, news, classifieds, and the like. In order for a user to perform a search in one of these subdomains, the user needs to know which subdomains the user desires to search and also how to access these subdomains. For example, a user may have to navigate through links to select a subdomain to search. Accordingly, the ease of performing a general search is lost because a user has to select or specify a subdomain to search. Additionally, when a subdomain search is requested, a general search is not performed.

BRIEF SUMMARY OF THE INVENTION

Embodiments of the present invention generally relate to performing searches in vertical subdomains. In one embodiment, a search query is received. Personal information for a user is then determined. A search may be performed in a general subdomain of general content using the search query. For example, the general subdomain of general content may be a WWW search. Then, a vertical subdomain is determined based on the personal information. A search is then performed in the vertical subdomain of specialized content using the search query. The search performed in the general subdomain and the search performed in the vertical subdomain generate general search results and vertical search results, respectively. The results may be combined and outputted to a client.

In one embodiment, a method of performing a search using a general subdomain including general content and one or more vertical subdomains is provided. Each vertical subdomain includes specialized content. The method comprises: receiving a search query; determining personal information for a user; causing a search to be performed in a general subdomain of general content using the search query; determining a vertical subdomain based on the personal information; and causing a search to be performed in a vertical subdomain of specialized content using the search query.

In another embodiment, a search server for performing searches in general content and specialized content is provided. The search server comprises: a query processor configured to receive a query; one or more general search engines configured to perform searches in a subdomain including at least a part of the general content; and one or more vertical search engines configured to perform searches in a subdomain including at least a part of the specialized content, wherein query is submitted to a general search engine and a vertical search engine, the vertical search engine determined based on personal information associated with a user.

In yet another embodiment, a method for personalized information retrieval for use with a plurality of electronic information retrieval engines is provided. At least one of the engines (a "general engine") supports general queries against indexed Internet content and a plurality of the other engines ("vertical engines") supports queries against specialized content. The method comprises: storing information personalized to a user; receiving a search query from the user; submitting the search query to the general engine; transmitting a response to the user based in part on output from the general engine; and automatically facilitating access to one or more of the vertical engines as a part of the response for the user, in a manner based at least one of part of the personalized information and part of the search query.

In another embodiment, a method for personalized information retrieval for use with a plurality of electronic information retrieval engines is provided. At least one of the engines (a "general engine") supports general queries against indexed Internet content and a plurality of the other engines ("vertical engines") supports queries against specialized content. The method comprises: storing information personalized to a user in a computer system remote from the user; receiving a search query from the user; submitting the search query to the general engine; transmitting a response to the user based in part on output from the general engine; and automatically facilitating the user's access to one or more of the vertical engines as part of the response, based in part on the personalized information.

In another embodiment, an information retrieval method for use with a plurality of electronic information retrieval engines is provided. At least one of the engines (a "general engine") supports general queries against indexed Internet content and a plurality of the other engines ("vertical engines") supports queries against specialized content. The method comprises: receiving a search query from the user; submitting the search query to the general engine; transmitting a response to the user based at least partly on output from the general engine; and when the search query includes a predetermined operator, automatically facilitating the user's access to one or more of the vertical engines selected independently of the predetermined operator.

In another embodiment, an information retrieval method for use with a plurality of electronic information retrieval engines is provided. At least one of the engines (a "general engine") supports general queries against indexed Internet content and a plurality of the other engines ("vertical engines") supports queries against specialized content. The method comprises: presenting a graphical user interface to the user including one or more tabs corresponding to a plurality of the vertical engines; receiving a search query from the user; in a first interaction mode, receiving user input selecting at least one of the tabs; and automatically facilitating the user's access to the vertical engines by processing the query using the vertical engine corresponding to the selected tab; and in a second interaction mode, submitting the search query to the general engine; transmitting a response to the user based at least partly on output from the general engine; and automatically facilitating the user's access to a selected one or more of the vertical engines as part of the response, based at least partly on the search query, wherein the corresponding vertical engines and the selected vertical engines are controlled by the same business owner of the general engine.

A further understanding of the nature and the advantages of the inventions disclosed herein may be realized by reference of the remaining portions of the specification and the attached drawings.

BRIEF DESCRIPTION OF THE DRAWINGS

FIG. 6 depicts an interface according to one embodiment of the present invention;

FIG. 8 depicts an interface according to one embodiment of the present invention.

DETAILED DESCRIPTION OF THE INVENTION

Figure 1:
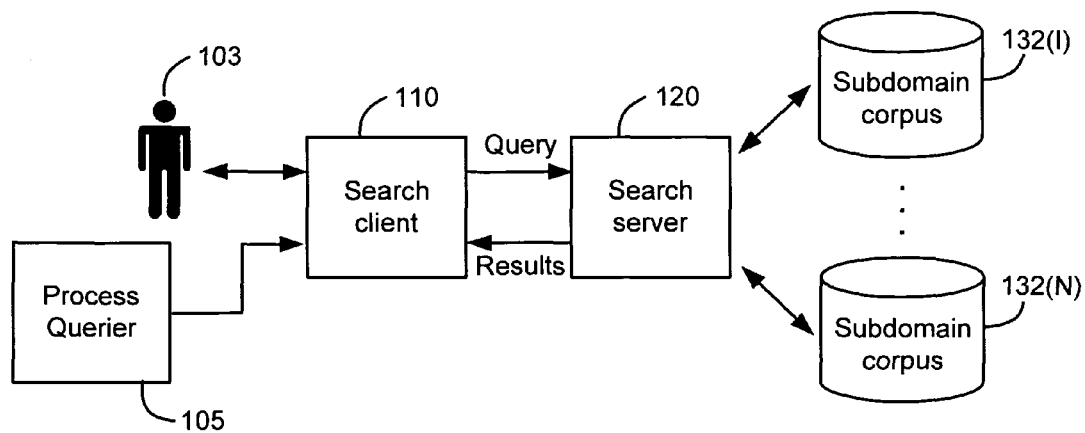
FIG. 1 is a block diagram of a search system according to embodiments of the present invention.

Embodiments of the invention will now be described, by way of example, not limitation. It is to be understood that the invention is of broad utility and may be used in many different contexts.

The example of a search process as described herein below can be modeled by a searcher presenting to a search system a query and receiving a response (search results) indicating the one or more "hits" found. A query can be in the form of a search query string comprising one or more tokens delimited by delimiters or parsing rules. In addition to varying a search based on variations of the search query string, context might be also taken into account. For example, the querier might have previously set constraints on the search, such as to return only age-appropriate hits, prior searches might be taken into account, and a querier identity (such as the Yahoo! ID currently associated with the Web browser client submitting the search query string) and settings set by the user.

When a query is received by a search system, it processes the search and returns one or more "hits", where a "hit" is the atomic unit handled by the search system. For example, where the search system manages a structured database, the hits are records from the structured database. Where the search system manages documents, such as text documents, image and text documents, image documents, HTML documents, PDF documents, or the like, the atomic unit is the document. It should be understood that the present invention is not limited to any particular atomic unit, but by way of example, much of this disclosure describes searching using the document as the atomic unit. Furthermore, a structured database is not required.

A hit is an atomic unit that the search system identifies as matching criteria defined by the query. It should be understood that the search system need not provide all hits or only hits that match the query. For example, the search system might limit the number of hits returned to some number, might apply other limitations to the query term, such as omitting hits that match the query, ignore duplicate hits, etc. The search system might also expand the search results to include hits that almost match the query, hits that are designated to be included in searches, such as special topic hits, advertising hits, etc. Some expansion or contraction might be dependent on the size or content of the search results prior to such expansion or contraction. For example, the search engine might add hits that are close if no hits would otherwise be returned and might remove hits if too many hits would have been returned, such as by deleting common words from queries prior to completing the search results.

A searcher can be a human user, such as a person typing in search terms into a browser window to query a search engine via the Web, but can also be an automated process, such as a computer program capable of sending queries to search engines in the form expected by the search engine. For example, a computer program might generate queries and form HTTP messages directed at a Web server coupled to a search engine.

In many of the examples shown herein, the search engine searches among a set of documents for documents (hits) that match the criteria defined by the query. It should be understood that the term "document" is generally used to refer to units of the corpus being searched. A document can be a document, such as a contract, a file, a story, a writing, or the like, but might also be a snippet of text, data that might be considered part of a document in other contexts, program code, image data, a stored file, or the like. Therefore, the term need not be narrowly construed.

In searching, the search engine might pull from all available documents it has indexed, but the search engine might instead limit the search to documents within one or more subdomains, where a subdomain is a previously designated proper subset of all the documents available to the search engine. In some instances, a subdomain might be further subdivided into smaller subdomains.

Examples of subdomains are the Yahoo! properties. Examples of Yahoo! properties include Yahoo! News, Yahoo! Sports, Yahoo! Mail, Yahoo! Shopping, Yahoo! Auctions, Yahoo! Weather, etc. Subdomains are useful search tools as a user posing a query often knows that information outside of a particular domain would not be useful in that instance. For example, the user might be interested in obtaining weather information for New York. A global search might pick up many sports stories that incidentally mention the weather in New York and its effect on some sports events, but the user might already have determined that any hits outside of the Yahoo! Weather property may not be useful. One advantage of the use of subdomains is that the user can enter a search in a generic search input object, such as a dialog box, and have the search server determine the user's intended subdomain(s). The search server may use personal information and/or the search query to determine the subdomain(s). Also, a general search may be performed in addition to performing a subdomain search.

Referring to the figures, an exemplary search system will now be described.

FIG. 1 is a block diagram of a search system 100 according to embodiments of the present invention. Using search system 100, a querier issues a search request to a search server using a search client, such as a Web browser client. As shown in FIG. 1, a human user 103 or a computer process 105 issues a query using search client 110. The search query, typically in the form of a search query string, is sent to a search server 120, which returns search results responsive to the search query to search client 110. In other variations, the search query comes from one system and the results are routed to another system.

Search server 120 is shown coupled to several subdomain corpuses 132. It should be understood that, for storage efficiency or other reasons, the content or information of the subdomain corpuses might overlap such that some content or information is present in more than one subdomain corpus. Throughout this disclosure, where there are multiple instances of an object and the number of instances is not critical, the instances are numbered from "1" to "N" with the understanding that the value of N need not be identical from use to use, unless otherwise indicated. For example, N is used as the number of subdomains, but that number might vary from example to example. It should also be understood that nothing here requires that all instances be used.

The interconnections between various systems need not be described in detail, as such methods of interconnections can be accomplished using well-known techniques. For example, search client 110 might be a personal computer running an HTTP client, such as a Web browser client, and communicating with an HTTP server running at search server 120, interconnected over a network such as the global Internet. It should be understood that other embodiments also fall within the scope of the invention. For example, search client 110 might be implemented as a handheld device, a computer with no human user interface, a dedicated device, a kiosk, etc. Also, the clients and servers need not use HTTP, but might use a different protocol for making requests for pages and objects and for responding to those requests.

In operation, and as described in further detail below, search client 110 sends a search query string to search server 120, possibly also including personal information such as a Yahoo! ID of the Yahoo! user sending the request. With that personal information, search server 120 might look up user demographics for the identified user and use that to perform the search. Search server 120 parses and analyzes the search query string to determine if a subdomain search is appropriate, then sends the query to the appropriate subdomain(s) and/or performs a general search.

Figure 2:
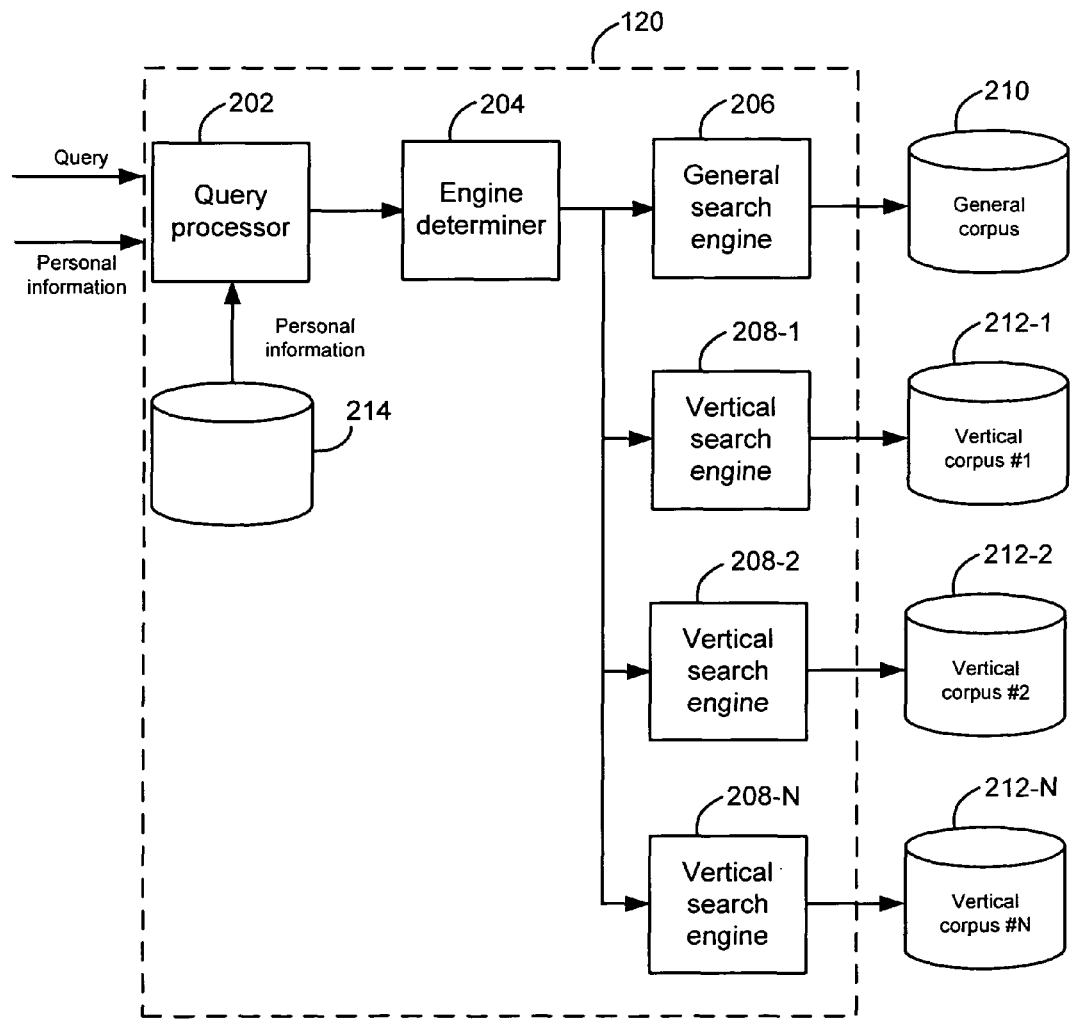
FIG. 2 depicts a more detailed embodiment of search server according to embodiments of the present invention.

FIG. 2 depicts a more detailed embodiment of search server 120 according to embodiments of the present invention. Search server 120 includes a query processor 202, an engine determiner 204, a general search engine 206, and one or more vertical search engines 208-1-208-N. Although a single general search engine 206 is shown and one or more vertical search engines 208 are shown, it will be understood that any number of general search engines 206 and vertical search engines 208 may be provided.

A plurality of subdomain corpuses 132 are depicted as a general corpus 210 and one or more vertical corpuses 212(1)-212(N). It should be understood that any number of general corpuses 210 and vertical corpuses 212 may be included. Although a one-to-one relationship from a search engine to a corpus is shown, it should be understood that a search engine may access multiple corpuses. Also, information may overlap between different corpuses including information in general corpus 210 and vertical corpus 212.

General corpus 210 includes general information. For example, general corpus 210 may be information that is searched when a query is received through a generic search object box. General corpus 210 thus includes general information that is not organized in specialized categories. For example, a general corpus may be the WWW, all of Yahoo!'s properties, all indexed content, and the like.

Vertical corpuses 212 are organized with specialized content. For example, a first vertical corpus may include information about automobiles and a second vertical corpus may include information about weather. The content in the subdomains may be manually organized into the specialized content or automatically organized. For example, a user may decide that an article on automobiles should be in an automobile subdomain or a program may automatically detect that the article is about automobiles and store the article in the automobile subdomain.

Query processor 202 is configured to receive a query from search client 110 and to determine personal information for a user. For example, personal information may be received from search client 110, determined by query processor 202, retrieved from storage 214, etc. In one embodiment, the personal information is information that is specific to a user and is used to determine which vertical engines to use in searching subdomains. For example, personal information may be a user ID, a specification of user preferences, etc. Different types of personal information will be described in more detail below.

The personal information and query is then received from query processor 202 by engine determiner 204. Engine determiner 204 is configured to determine a search engine in which to send the query. For example, the query may be submitted to general search engine 206 in addition to one or more vertical search engines 208.

In one embodiment, engine determiner 204 determines the engine in which to submit a query based at least on a part of a query and/or the personal information. For example, personal preferences may be applied to all searches received through a generic search object. The preferences may indicate that for all searches, certain corpuses should be searched.

Also, the determination may be applied on a per-query basis. For example, depending on certain information, such as user aggregate behavior, corpuses 212 may be determined. The user aggregate behavior may indicate that a user has searched these corpuses 212 the most. These corpuses 212 may be searched using the query.

Additionally, rules may be personalized for a user. For example, rules may indicate that a search for a celebrity name may cause a search to be performed in a celebrity news corpus 212 and a music corpus 212.

In one embodiment, a query parser is used to deconstruct or segment the query. For example, the query parser is used to determine that a query is for a celebrity name. The query is sent through a rules engine that uses rules to determine information about the query. For example, the rules engine knows that 5000 names are celebrity names. The query is deconstructed into segments and if some of the segments are found in the celebrity names, then one or more corpuses 212 associated with the celebrity names are determined. Additionally, other terms may be associated with other corpuses 212. Accordingly, the rules engine is used to identify whether a query is appropriate for certain corpuses 212.

The query may also be reformulated for a corpus 212. For example, information may be added to the query. If the query includes a segment of "Las Vegas", a zip code for Las Vegas may be added to the query for a search in a yellow pages corpus 212.

Confidence values may also be used in searching corpuses 212. The confidence values may be based on user preferences or user histories. If a user had previous searches performed in a corpus 212 or if a user has a user preference for a corpus 212, a higher confidence value may be assigned. The confidence values may be used to determine if a corpus 212 should be searched. Queries for various corpuses 212 may be assigned confidence values. A conditional may be used to determine that certain corpuses 212 with confidence values above a certain number should be searched.

Also, confidence values may be assigned to search results received from different corpuses 212. The confidence value may indicate how relevant the search results from the corpus 212 are to the query. A page generator may only display certain results with confidence values over a certain amount.

Additional methods for determining a vertical corpus 212 to search are described in the Hints application.

In one embodiment, when a query is received by engine determiner 204, it sends a query to general search engine 206 and one or more applicable vertical search engines 208. Thus, general search engine 206 performs a search of general content found in general corpus 210 in addition to one or more vertical search engines 208 that perform searches in one or more vertical corpuses 212. Accordingly, search results are generated from general content, such as indexed web content, and in addition to search results from specialized content. Also, in another embodiment, a general search using general corpus 210 may only be performed or a vertical search using one or more vertical corpuses 212 may only be performed.

In one embodiment, vertical search engines 208 are controlled by a business owner of general engine 206. Accordingly, a general search may be driven to a vertical search engine by the business owner. Additionally, paid ads associated with the vertical search engines may be then placed with the output for the query.

In another embodiment, vertical engines 208 may be used to facilitate electronic execution of a business transaction. For example, personal premium content may be searched as a corpus 212. Information for a user's premium sports, auction, etc. subscriptions may be searched as corpuses 212.

Figure 3:
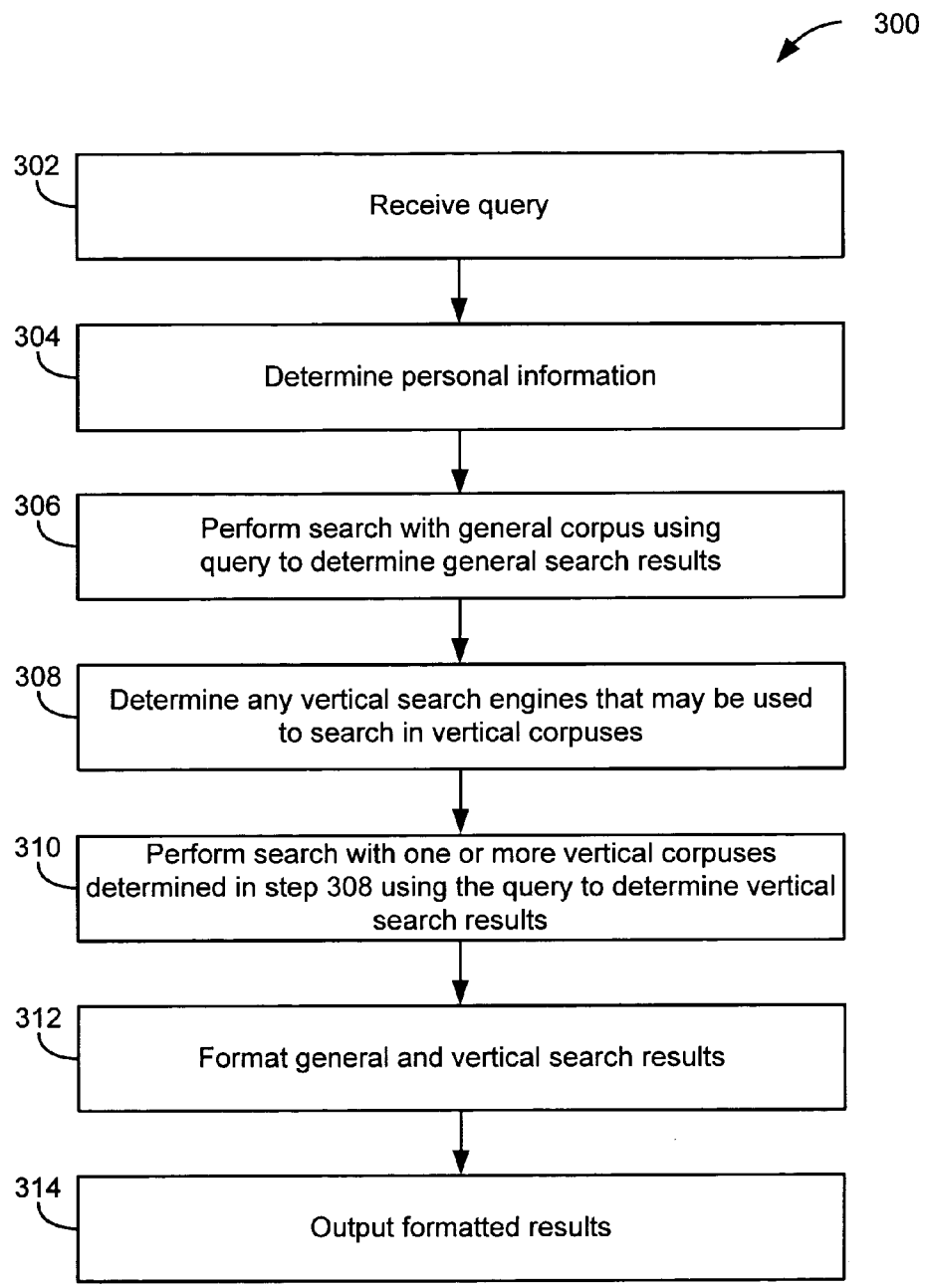
FIG. 3 depicts a simplified flowchart of a method for performing searches according to one embodiment of the present invention.

FIG. 3 depicts a simplified flowchart 300 of a method for performing searches according to one embodiment of the present invention. In step 302, a query is received. For example, a query may be received from a user 103 or a processor querier 105 through a search client 110. The query may include a search query string that is used to perform a search.

In step 304, personal information is determined. For example, user information may be received from a user through search client 110 in the form of a user ID. In one embodiment, a cookie may provide user information. The user information may be used to retrieve personal information from stored information, such as user specifications that have been stored.

In step 306, general search engine 206 performs a search with information in general corpus 210 using the query to determine general search results. For example, a general search may be a search through indexed web content.

In step 308, any vertical search engines 208 that may be used to perform a search in any vertical corpuses 212 are determined. In one embodiment, the personal information determined in step 304 is used to determine vertical search engines 208. The personal information may indicate which vertical search engines 208 (or vertical corpuses 212) are preferred by a user for certain searches. Additionally, vertical search engines 208 may be determined based on at least a part of the query. For example, part of the query may indicate a vertical corpus 212 to search.

In step 310, a search is performed with one or more vertical corpuses 212 using the query to generate vertical search results.

In step 312, the general and vertical search results are formatted. For example, the general and vertical search results may be combined into a web page. Additionally, other information, such as sponsored links, ads, etc. may be included with the general and vertical search results.

In step 314, the formatted results are outputted. For example, a web page may be outputted and displayed for a user to view. Additionally, the results may be sent to a user using other transports, such as a user's email address.

Figure 4:
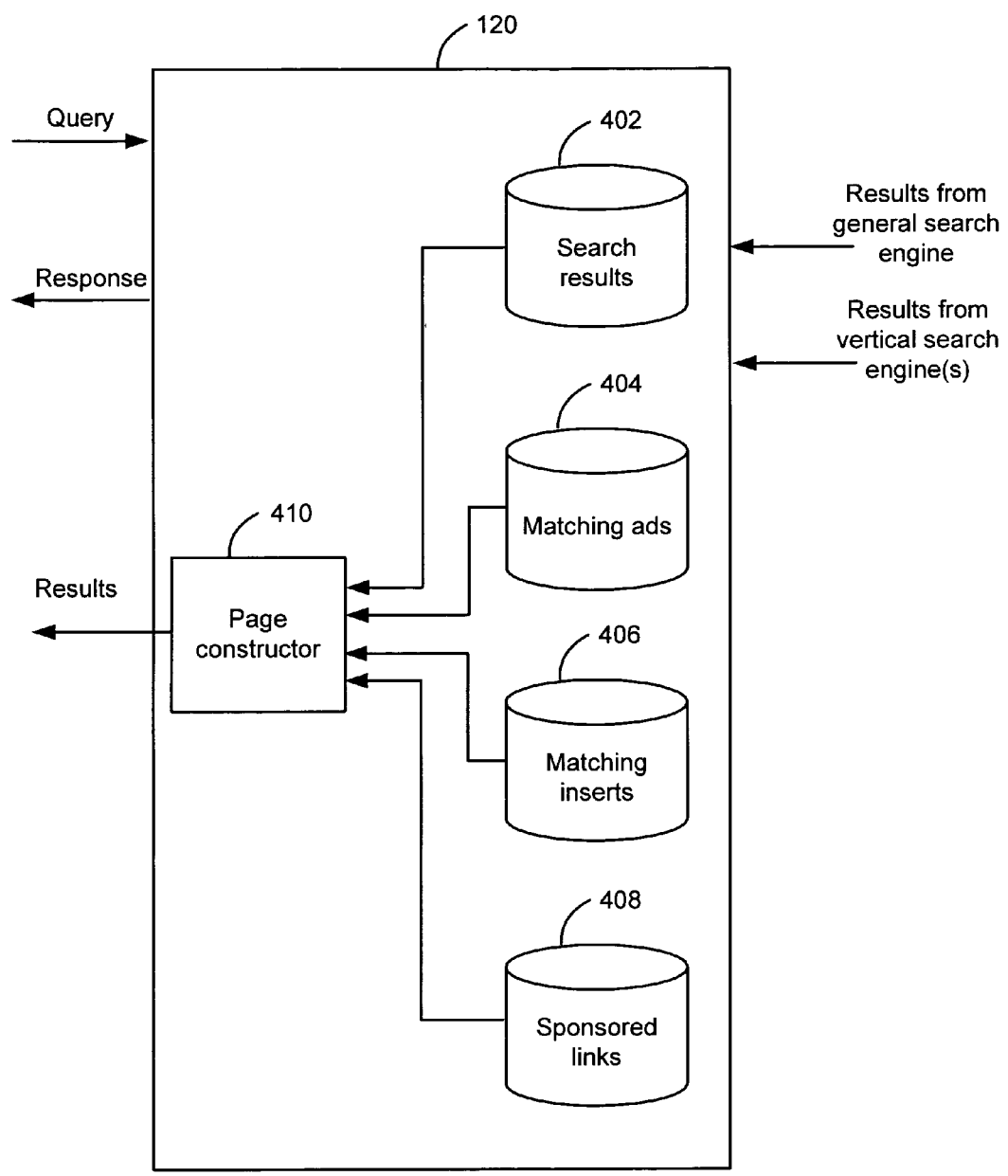
FIG. 4 depicts a block diagram of elements that might be used to generate a response to a query according to one embodiment of the present invention.

FIG. 4 depicts a block diagram of elements that might be used to generate a response to a query according to one embodiment of the present invention. Search server 120 includes a matching ads database 404, a matching inserts database 406, and a sponsored links database 408. Search server 120 obtains search results 402 that have been generated from general search engine 206 and one or more vertical search engines 208. The search results may be combined with information for matching ads 404, matching inserts 406, and sponsored links 408.

A page constructor 410 determines which search results and which additional information should be included in a page to send to a client in response to a query. In one embodiment, page constructor 410 may use the query to determine which information for matching ads 404, matching inserts 406, and sponsored links 408 to include in a page. Additionally, other information, such as any personal information may be used to determine the information to be included in the page. The information in matching ads 404, matching inserts 406, and sponsored links 408 may also be determined based on the general search engine 206 or vertical search engines 208 used to perform the search. For example, certain matching ads may be associated with different vertical corpuses 212. For example, music matching ads may be used if a CD vertical corpus 212 has been searched.

Page constructor 410 then formats results from the general search engine 206 and vertical search engines 208 in a page along with the additional information. In one embodiment, links to the search results are provided where a link may be selected by a user. The link then causes a page or document to be retrieved and displayed. Additionally, the link may cause an additional search to be performed. For example, a vertical search engine may be accessed and a search performed.

One example of generating a page using page constructor 410 may be for a query received from a user of "Tom Cruise". The query is segmented and it is recognized that "Tom Cruise" is a celebrity name. It is also determined that the user lives in the United States. It is then determined that a U.S. news corpus 212 should be searched for "Tom Cruise". A conditional is also added that indicates a rule that the search results should only be displayed if more than five results are found. Page constructor 410 receives the search results and determines if the conditional is met. If more than five results from the U.S. news corpus 212 are received, page constructor 410 displays the results in a page.

Figure 5:
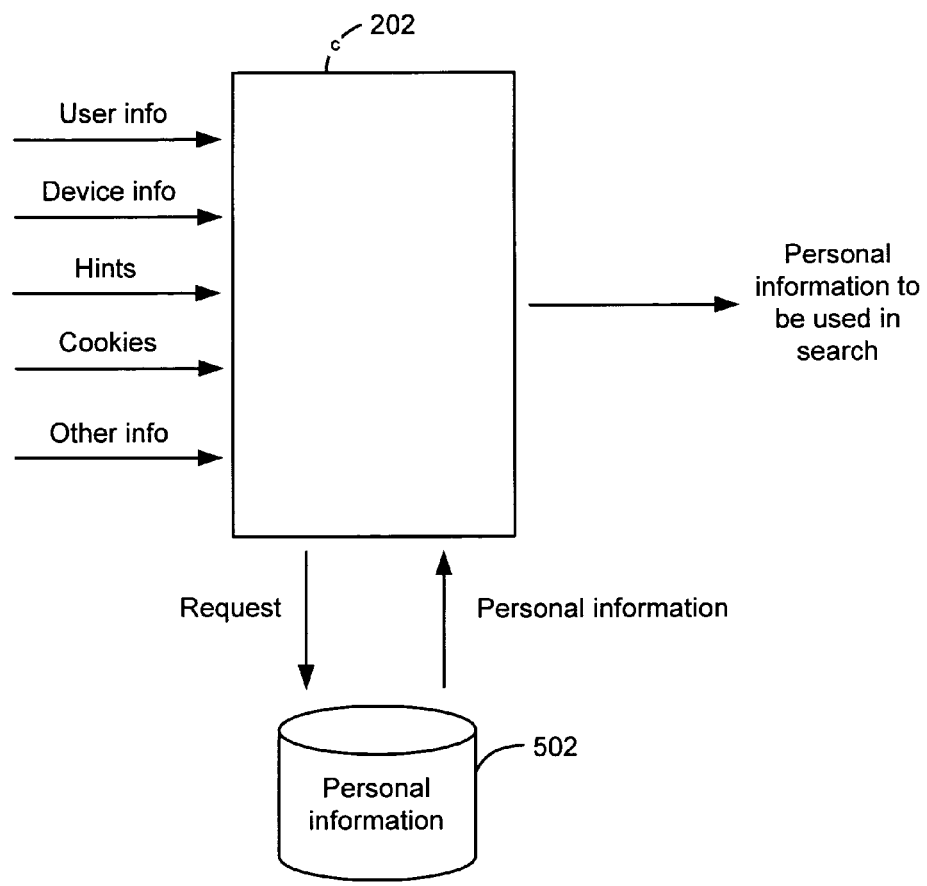
FIG. 5 depicts examples of information that may be used by search server to determine personal information to be used in a search according to one embodiment of the present invention.

FIG. 5 depicts examples of information that may be used by search server 120 to determine personal information to be used in a search according to one embodiment of the present invention. In one embodiment, user information may be inputted by a user. For example, a user may input a user ID or account number with a password. Also, cookies may be used to send information to search server 120. For example, user account information may be sent when a user submits a search or logs onto a web site.

Information may also be received from a client 110 used by a user. For example, a geographic location of a device used by a user may be received or determined by search server 120. A location that includes an implicit geographic constraint may then be included in a query. Also, location information may be stored for a user and retrieved based upon a user ID or other user identification information. For example, the location information may be a user's default location that may be used to determine vertical corpuses 212 to search in.

In one embodiment, information received from a client may be used by search server 120 to request information from a personal information database 502. In one embodiment, this information is stored on the server side and is not stored with the client. For example, a user ID may be used to retrieve information that is stored for the user ID. Part of the query may also be used to retrieve information. The stored information may be a user specification that indicates user preferences. The specification may include conditions that may be used in a subsequent query or conditions that will be used to determine a vertical search engine 208 to use. In one embodiment, a user may define the personal information found in personal information database 502 or a practitioner or owner of search server 120 may define the information. The specification may also define associations between personal information and certain vertical engines 208. The associations may specify which vertical search engines 208 are preferred by a user. Those vertical search engines 208 would then be searched first. The defined associations may be modified by a user and/or defined by a user or owner of search server 120. Other personal information may be historical activity information for a user. For example, if a user typically searches certain corpuses, those corpuses may be selected for a search.

An example of a page 600 constructed by page constructor 410 is shown in FIG. 6. In this example, the search string was "camera". Page 600 includes information organized into different page layout areas 602, 604, 606, 608, 610, 612, and 614.

The top of page 600 includes an indication of the search, a dialog box in which another search can be initiated, and clickable links for help, home page, etc. General search results, such as search results from a Web index for "camera", are listed in layout area 608. In this example, upon a search query using the query string "camera", the search server populates storage 402 with Web search results, and possibly other results, populates storage 404 with advertisements to be associated with the search string, populates storage 406 with inserts associated with the search string and populates storage 408 with sponsored links associated with the search string.

Advertisements might be selected based on what views are sold. Thus, an advertiser might pay to have a particular advertisement shown on a search results page if the search query includes the word "camera". Sponsored links might also be similarly positioned, such that the order and/or placement of the links might depend on who pays for their presentation and for what search conditions.

Layout area 608 includes links that represent hits responsive to the search term and are preferably independent of the sponsors' links. Layout area 610 is provided for insertion of the matching advertisement, or a general advertisement in some cases. Layout area 612 and 214 provide additional matching inserts, which are specific to the search terms used, but are typically not search results, sponsored matches or advertisements. In this example, layout area 612 contains links for executing alternative searches and layout area 614 contains links for subdomain specific searches that might be alternatively executed.

In the preferred embodiment, however, searches in vertical corpuses 212 can be run directly in the first instance from the search query dialog box. For example, personal information may indicate that a user desires a search in an auctions corpus when a search query of "camera" is received. The personal information may have been specified by a user or other entity, determined based on a user's prior activity (the user had viewed camera auctions sites before), etc. This saves the user time and effort and also allows for more targeted inserts, advertisements and sponsored links. In this example, the search server would direct the search string "camera" to a vertical search engine 208 specific to Yahoo! Auctions.

The search results page would be more focused as a result. The matching inserts might not include a link for yellow page searches for the search term and the sponsored links and advertisements can be selective. Thus, one sponsor might opt to purchase sponsored link placements for the term "camera" under the auction vertical corpus, but not under a general search or a search in the yellow pages vertical corpus. In this manner, advertisements and sponsored links can be more focused. This is useful, for example, if an advertiser wants to reach users that are looking to buy or sell cameras at auction, but not if that user is looking for the location of a local camera store.

Layout area 602 displays matching inserts 406. In this example, those matching inserts are "Inside Yahoo!" links that relate to the search term. Layout area 604 displays directory matches, which are matches from a corpus encompassing the Yahoo! directory, a hierarchical arrangement of topics and links associated with those topics at various levels in the hierarchy. Layout area 606 displays sponsored matches, which are hits provided to the user based on sponsorship of particular terms.

While the user might enter a simple search query such as "camera", the user might also enter more complex queries, including searches that might be applied to corpuses.

Figure 7:
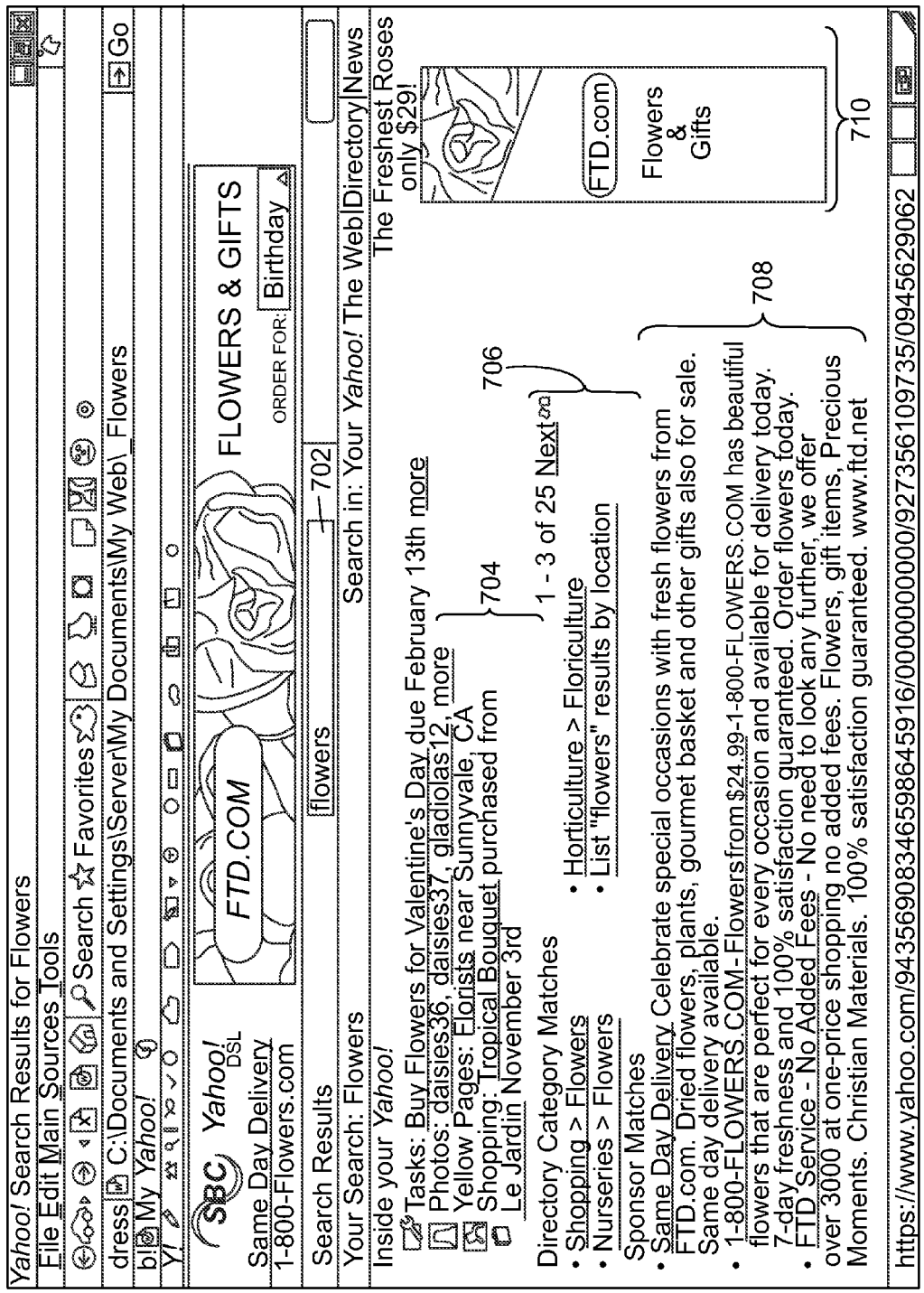
FIG. 7 depicts an interface according to one embodiment of the present invention.

FIG. 7 depicts an example of a page 700 constructed by page constructor 410. In this example, the search string was "flowers" shown in a general search query object 702. General search query object is configured to receive general search queries. For example, the queries may be for the World Wide Web. Embodiments of the present invention may determine and search corpuses 212 in addition to performing a general search in response to receiving a query in general search query object 702.

Page 700 includes information organized into different page layout areas 704, 706, 708, and 710. Although these layouts are shown, it should be recognized that other layouts may be provided.

The top of page 700 includes an indication of the search, and clickable links for help, home page, etc. General search results, such as search results from a Web index for "flowers", are listed in layout area 706 and 708. In this example, upon a search query using the query string "flowers", the search server populates storage 402 with Web search results, and possibly other results, populates storage 404 with advertisements to be associated with the search string, populates storage 406 with inserts associated with the search string and populates storage 408 with sponsored links associated with the search string.

Advertisements might be selected based on what views are sold. Thus, an advertiser might pay to have a particular advertisement shown on a search results page if the search query includes the word "flower". Sponsored links might also be similarly positioned, such that the order and/or placement of the links might depend on who pays for their presentation and for what search conditions.

Layout area 706 includes links that represent hits responsive to the search term and are preferably independent of the sponsors' links. Layout area 708 is provided for insertion of the sponsored links. Layout area 710 provide additional matching inserts, which are specific to the search terms used, but are typically not search results, sponsored matches or advertisements.

Accordingly, searches in vertical corpuses 212 can be run from the search query dialog box 702. For example, personal information may indicate that a user desires a search in a yellow pages corpus when a search query of "flowers" is received. The personal information may have been specified by a user or other entity, determined based on a user's prior activity (the user had viewed flowers from the site before), etc. This saves the user time and effort and also allows for more targeted inserts, advertisements and sponsored links. In this example, the search server would direct the search string "flowers" to a vertical search engine 208 specific to Yahoo! Yellow pages and Shopping.

The search results page would be more focused as a result. The matching inserts might not include a link for yellow page searches for the search term and the sponsored links and advertisements can be selective. Thus, one sponsor might opt to purchase sponsored link placements for the term "flower" under the yellow pages vertical corpus, but not under a general search. In this manner, advertisements and sponsored links can be more focused. This is useful, for example, if an advertiser wants to reach users that are looking to buy flowers.

Figure 8:
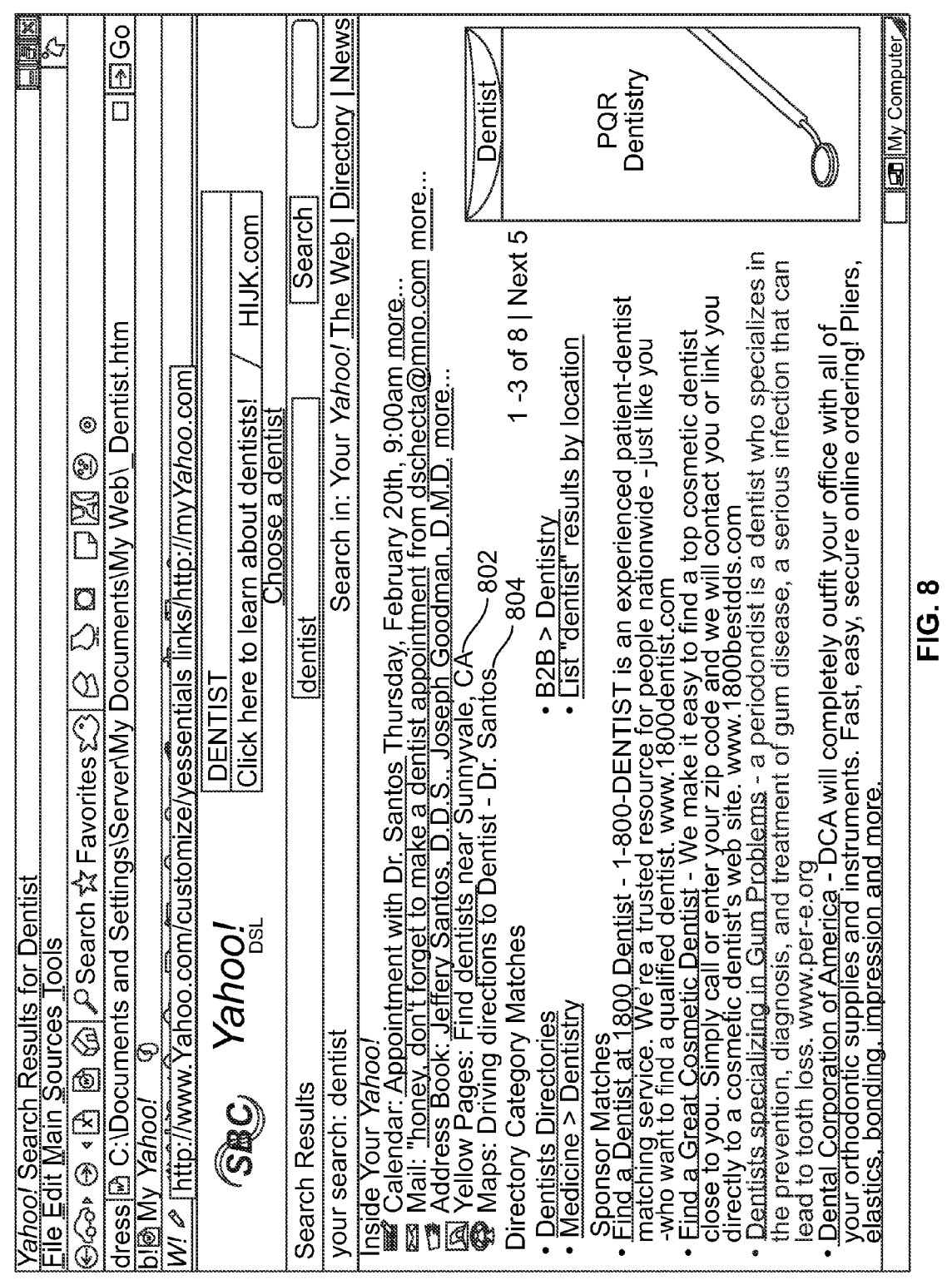

FIG. 8 depicts an example of a page 800 constructed by page constructor 410. In this example, the search string was "dentist" shown in a general search query object 802. General search query object is configured to receive general search queries. For example, the queries may be for the World Wide Web. Embodiments of the present invention may determine and search corpuses 212 in addition to performing a general search in response to receiving a query in general search query object 802.

Page 800 includes information organized into different page layout areas 804, 806, 808, and 810. Although these layouts are shown, it should be recognized that other layouts may be provided.

The top of page 800 includes an indication of the search, and clickable links for help, home page, etc. General search results, such as search results from a Web index for "dentist", are listed in layout area 806 and 808. In this example, upon a search query using the query string "dentist", the search server populates storage 402 with Web search results, and possibly other results, populates storage 404 with advertisements to be associated with the search string, populates storage 406 with inserts associated with the search string and populates storage 408 with sponsored links associated with the search string.

Advertisements might be selected based on what views are sold. Thus, an advertiser might pay to have a particular advertisement shown on a search results page if the search query includes the word "dentist". Sponsored links might also be similarly positioned, such that the order and/or placement of the links might depend on who pays for their presentation and for what search conditions.

Layout area 806 includes links that represent hits responsive to the search term and are preferably independent of the sponsors links. Layout area 808 is provided for insertion of the sponsored links. Layout area 810 provide additional matching inserts, which are specific to the search terms used, but are typically not search results, sponsored matches or advertisements.

Accordingly, searches in vertical corpuses 212 can be run from the search query dialog box 802. For example, personal information may indicate that a user desires a search in a yellow pages corpus when a search query of "dentist" is received. The personal information may have been specified by a user or other entity, determined based on a user's prior activity (the user looked up a dentist before), etc. This saves the user time and effort and also allows for more targeted inserts, advertisements and sponsored links. In this example, the search server would direct the search string "dentist" to a vertical search engine 208 specific to Yahoo! Yellow pages and Maps.

The search results page would be more focused as a result. The matching inserts might not include a link for yellow page searches for the search term and the sponsored links and advertisements can be selective. Thus, one sponsor might opt to purchase sponsored link placements for the term "dentist" under the Yellow pages vertical corpus, but not under a general search. In this manner, advertisements and sponsored links can be more focused. This is useful, for example, if an advertiser wants to reach users that are looking for a dentist.

Accordingly, embodiments of the present invention are configured to perform searches in a general corpus and/or one or more vertical corpuses. The vertical search engines are determined based on a query and/or personal information. A search is then performed using the vertical search engines and a general search engine to generate general search results and vertical search results. The general search results and vertical search results may then be combined and outputted to a user.

Embodiments of the present invention provide many advantages. For example, a general search and specialized search may be performed when one query is received. Also, personal information is used to determine which corpuses are searched. Thus, the search is personal and specific to a user. Moreover, a user may not have to explicitly specify which corpuses to search when a query is entered.

While the present invention has been described using a particular combination of hardware and software implemented in the form of control logic, it should be recognized that other combinations of hardware and software are also within the scope of the present invention. The present invention may be implemented only in hardware, or only in software, or using combinations thereof.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A computer implemented method of performing a search to retrieve electronic documents, using general subdomain corpus including general content and one or more vertical subdomain corpuses, each vertical subdomain corpuses including specialized content, the method comprising:
presenting a graphical user interface to a user;
receiving a search query from the user using the graphical user interface, wherein the received search query is based on a text query string inputted by the user;
determining personal information for the user;
causing a search to be performed by at least one of general search engines in the general subdomain corpus of general content using the search query, wherein the general content is not organized in specialized categories;

determining a vertical subdomain corpus from the one or more vertical subdomain corpuses based on the personal information of the user by a engine determiner of a search server coupled to a query processor and plurality of general search engines and vertical search engines; and causing a search to be performed by at least one of the special search engine in the determined vertical subdomain corpus of specialized content using the user search query to create a customized graphic user interface, wherein the specialized content is organized by one or more tabs corresponding to the plurality of vertical engines based on the vertical subdomain determined by the engine determiner to facilitate a selection of the vertical engines searching; and the organization of corresponding vertical engines and the selection of vertical engines into the customized graphic user interface are controlled by the same business owner of the at least one general engine.

2. The method of claim 1, wherein performing the search in the general subdomain corpus generates general uncategorized search results and wherein performing the search in the determined vertical subdomain corpus generates vertical organized search results, the method further comprising: outputting the general search results and vertical search results.

3. The method of claim 2, wherein outputting the general search results and vertical search results comprises returning one or more links to results in the general search results and the vertical search results.

4. The method of claim 3, wherein a link in the one or more links is configured such that activation of the link results in outputting results associated with the link.

5. A search server for performing searches in general content and specialized content to retrieve electronic documents, the search server comprising:

a query processor coupled to a plurality of general search engines and vertical search engines, the query processor configured to receive a query from a user presenting a graphical user interface to the user; wherein the received query is based on a text query string inputted by the user;

the one or more general search engines configured to perform searches in a general subdomain corpus including at least a part of the general content, wherein the general content is not organized in specialized categories;

the one or more vertical search engines configured to perform searches in a vertical subdomain corpus including at least a part of the specialized content, wherein the specialized content is organized by one or more tabs correspond to the plurality of vertical search engines determined by an engine determiner of the search server based on personal information associated with the user and input query from the user to create a customized graphic user interface for facilitating a selection of the vertical engines searching; and wherein the organization of corresponding vertical engines and the selection of vertical engines into the customized graphic user interface are controlled by the same business owner of the at least one general engine.

6. The search server of claim 5, wherein the general search engine is configured to perform a search using the general subdomain corpus including at least a part of the general content using the query to generate general search results.

7. The search server of claim 6, wherein the query submitted to the vertical search engine is configured to perform a search using the vertical subdomain corpus including at least a part of the specialized content using the query to generate vertical search results.

8. The search server of claim 7, further comprising a page constructor configured to generate a page including the general and vertical search results.

* * * * *